Oct. 9, 1928.
G. W. SMITH
1,686,715
TREATMENT OF EVAPORATOR WATER
Filed July 17, 1924
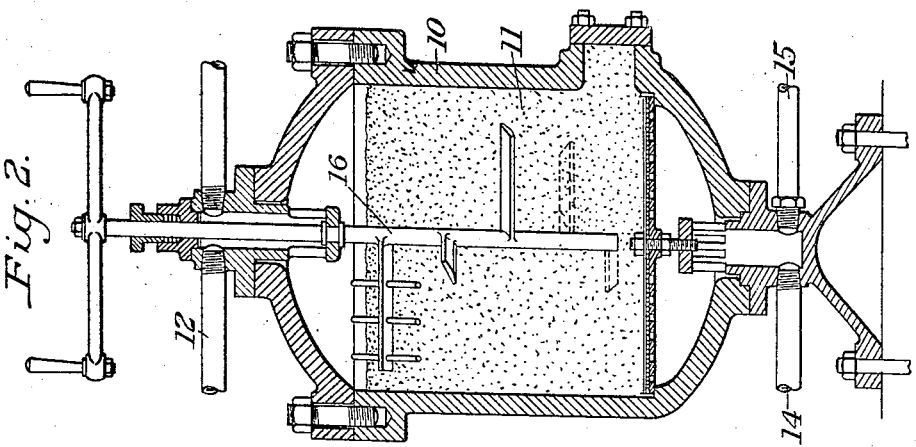
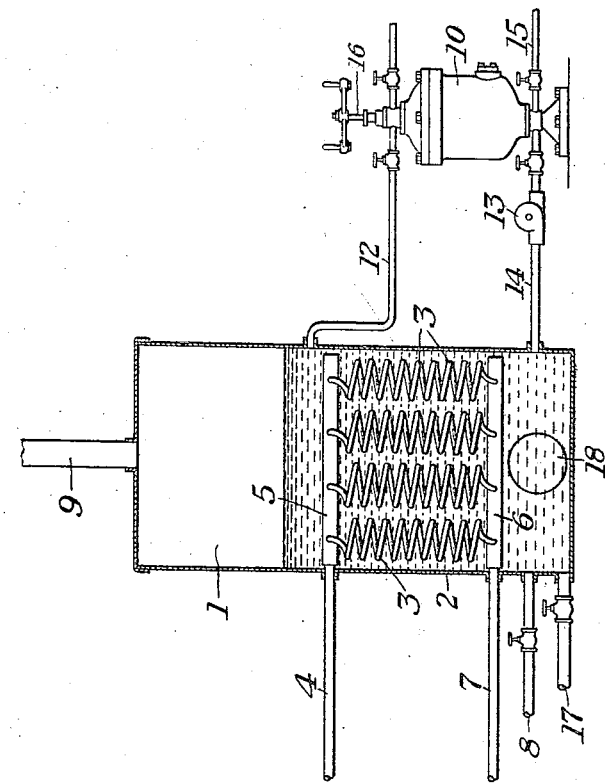
INVENTOR
George W. Smith
by his attorneys
Byrnes, Stebbins & Parmelee Patented Oct. 9, 1928.

1,686,715

UNITED STATES PATENT OFFICE.

GEORGE W. SMITH, OF PITTSBURGH, PENNSYLVANIA, ASSIGNOR TO JOHN M. HOPWOOD, OF DORMONT BOROUGH, PENNSYLVANIA.

TREATMENT OF EVAPORATOR WATER.

Application filed July 17, 1924. Serial No. 726,480.

The present invention relates to the treatment of evaporator water. The term "evaporator" is applied in the steam engineering art to denote devices for evaporating water, often under reduced pressure, so as to yield a distilled water for boiler feed water. The evaporators are also used for furnishing distilled water for other purposes, such as on shipboard.

The invention is more particularly applicable to evaporators of the so-called self-scaling type. In this type of evaporators, the heating surfaces are periodically flexed or deformed so as to crack off the scale which forms on them. Evaporators of this type usually consist of a container or shell holding the water to be evaporated in which are immersed steam pipes supplied with steam reduced somewhat below boiler pressure. The steam pipes are commonly in the form of helical coils, although other forms of pipes may be employed. When the scale is to be cracked from the heating pipes, steam at full boiler pressure is introduced into the pipes, causing a deformation of the pipes due to increased temperature and pressure, for the purpose of causing the scale to be cracked from the surfaces of the pipes.

Raw water is fed into the evaporator and steam is withdrawn from the evaporator and condensed to furnish the distilled water for the boiler feed. The evaporation of the water in the evaporator, of course, results in a concentration of the water impurities. These impurities commonly consist of hard scale-forming substances, the principal one of which is calcium sulphate, and substances which tend to form a soft scale or a sludge, such for example, as calcium carbonate, suspended clays and sometimes fibrous organic material, etc. In the usual practice of operating evaporators the scale-forming substances are to a more or less extent precipitated on the heating elements of the evaporator and the concentration of soluble impurities and sludge is kept within the desired limits by blowdown.

The scale which forms on the heating elements should be a hard scale, in order to be satisfactorily cracked off by the deformation of the surfaces of the heating elements. However, it is found that waters which contain considerable amounts of soft scale-forming substances, along with the hard scale-forming substances, form a scale which is too soft and flexible to be readily cracked off by the deformation of the heating element surfaces. Since the removal of the scale can not, therefore, be carried out entirely by the deformation of the heating pipes by increased steam pressure, the heating pipes have to be periodically withdrawn from the evaporator and the scale removed by hand.

The desirable condition in a self-scaling evaporator is virtually the opposite of that desired in a steam boiler, so far as the formation of scale is concerned. In a steam boiler, it is desired that the scale be as soft as possible so that it may be removed by mechanically cutting off the scale from the heating surfaces of the boiler. In the evaporator, on the other hand, it is desirable that the scale be as hard as possible, since the hardness makes a stiff scale which can be cracked off by the amount of deformation which is available for the heating surfaces.

The principal hard scale-forming substance in raw water is calcium sulphate, although there are other minor hard scale-forming substances, such for example, as magnesium orthosilicate. The solubility of calcium sulphate at the temperatures encountered in steam boilers and evaporators decreases with increasing temperature. The result is that the calcium sulphate is precipitated at the heating surfaces of a boiler or an evaporator and forms an adherent scale which is very hard and stiff when it consists of substantially pure calcium sulphate. The solubility of calcium carbonate, which is the principal salt in the water which tends to form a soft scale or sludge at the temperatures encountered in boilers and evaporators, increases with the temperature, so that the calcium carbonate tends to precipitate in the cooler portions of the water away from the heating surfaces of the boiler or evaporator. The calcium carbonate, therefore, exists in the water principally in the form of a suspension which tends to settle out as a sludge. The circulation of the water, however, carries the suspended calcium carbonate into contact with the heating surfaces where calcium sulphate is being precipitated, and if the concentration of the suspended calcium carbonate is sufficient, a considerable proportion of the scale will be formed by the calcium carbonate which is entrapped by the calcium sulphate. A microscopic examination of boiler scales and evaporator scales from waters containing calcium sulphate and calcium carbonate shows a considerable proportion of calcium carbonate crystals entrapped and held in a matrix of calcium sulphate. The presence of calcium carbonate makes the scale softer and more flexible. While this softening may be desirable in a steam boiler, it is undesirable in a self-scaling evaporator.

Other salts whose solubility increases with the temperature, as well as suspended impurities such as clays, if present in the water in any considerable amount also tend to become entrapped and cemented in the calcium sulphate scale and tend to make it softer than a substantially pure calcium sulphate scale.

In accordance with my invention, I so treat the evaporator water as to remove from it those substances which would otherwise tend to make a soft scale, so that such scale as is formed on the heating surfaces of the evaporator will be a hard stiff scale which can be readily cracked by the slight deformation available for the heating surfaces. This is preferably carried out by drawing off water from the evaporator, passing it through a filter, which removes the suspended solids, such as the suspended calcium carbonate, clays, etc., and then returning the filtered water to the evaporator. By this procedure, the amount of suspended soft scale-forming substances is kept sufficiently low so that a hard scale is formed on the heating surfaces. As will readily be seen from the above explained solubility characteristics of calcium sulphate and calcium carbonate, the calcium sulphate will be precipitated at the heating surfaces of the evaporator, while the calcium carbonate will be precipitated in the form of a finely suspended sludge and can therefore be filtered from the evaporator water and its concentration kept sufficiently low so that not enough of the calcium carbonate is entrapped in the calcium sulphate scale to unduly soften it.

In the drawings, which illustrate the preferred form of apparatus for carrying out the process;

Figure 1 is a diagrammatic illustration taken partly in section of an evaporator provided with a filter for removing the soft scale-forming substances; and Figure 2 is a vertical section through the filter.

In the illustrated embodiment of the apparatus, reference numeral 1 indicates a self-scaling evaporator. The evaporator may be of any of the usual types on the market. In the particular form illustrated, the evaporator consists of a water chamber or shell 2, which holds the raw water to be evaporated. Immersed in the water are the heating elements shown as a plurality of helical coils 3, and usually of brass pipe. The steam is supplied through inlet pipe 4 and steam header 5 to the coils, and is withdrawn through the bottom header 6 and drain line 7. When boiler pressure of, say, about 150 lbs. is available, steam is normally supplied to the heating coils 3, at a pressure of about 90 lbs. per square inch. Periodically full boiler pressure of, say, 150 lbs. is admitted to the coils 3, causing the coils to become slightly deformed, but sufficient to flex their surfaces to crack off a hard scale, such as a substantially pure calcium sulphate scale. The raw water to be evaporated is introduced to the water chamber through a feed line 8, and the steam is drawn out through steam pipe 9.

In order to prevent the formation of a soft scale which can not be as readily cracked off by the deformation of the heating coils, I remove water from the evaporator, filter it of the suspended soft scale-forming solids, and return it to the evaporator. The preferred form of apparatus for accomplishing this is indicated in the drawing as a filter or deconcentrator 10. This consists of a bed 11 of filtering material, such as sand, or in the case of alkaline water, of a filter material which is not dissolved thereby, such, for example, as granulated smelter slag from copper smelting or the minerals forsterite or other members of the olivine group, or chromite, or any of the substances disclosed in the application of Ralph E. Hall, Serial No. 710,740, filed May 3, 1924. The water is continually, and preferably continuously, withdrawn from the evaporator through a pipe 12, passing downwardly through the filter bed 11, and returned by a pump 13 through a return pipe 14 to the evaporator. The filter may be periodically washed by passing wash water upwardly through it from the wash water pipe 15, the filter bed material being agitated by a stirrer 16.

While it is preferable to withdraw and filter the water continuously with, of course, the interruptions necessitated by cleaning the filter, the water might be withdrawn and filtered intermittently, so long as the treatment was sufficiently continual to keep down the concentration of soft scale-forming substances to the desired point. The exact percentage of the water supplied to the evaporator which is circulated through the deconcentrator 10 will be determined, of course, by the particular raw water being treated, and the desired hardness of the scale to be maintained on the heating surfaces.

The concentration of solid salts is kept within the desired limits of blowdown through the blowdown valve 17. The blowdown will also remove some of the suspended solids. The hard scale cracked from the heating coils 3 will be removed somewhat in the blowdown water and may also be taken out through the clean-out opening 18.

As will be readily apparent from the foregoing description, the suspended solids, which would be otherwise entrapped in the calcium sulphate scale and soften it, are removed by the filter 10, so that a hard scale is always formed on the heating surfaces of the evaporator, which can be readily cracked by their deformation.

While I prefer to withdraw water from the evaporator, remove the soft scale-forming substance from it and return it to the evaporator, the treatment of the evaporated water might be otherwise carried out to effect the removal of the soft scale forming substances, so that the scale formed on the heating surfaces of the evaporator is a hard scale. For example, the raw water before passing to the evaporator may be passed through an open feed water heater in which the calcium bicarbonate is broken down by the driving off of the carbon dioxide resulting in the precipitation of calcium carbonate, which can be filtered from the water, and the water thus freed from calcium carbonate and other filterable soft scale forming substances, but still containing calcium sulphate, may then be passed into the evaporator, where the concentration occurs with the formation of a hard scale on the heating surfaces of the evaporator. Or the raw water may be treated chemically prior to its introduction into the evaporator to break down and remove the calcium bicarbonate while leaving calcium sulphate or other hard scale forming impurities.

It will be apparent, therefore, that the invention is not limited to any particular sequence of steps as to the removal of the soft scale forming substances from the water, since the soft scale forming substances may be removed before the water is introduced into the evaporator or the removal of the soft scale forming substances may take place simultaneously with the evaporation of the water in the evaporator, as by the withdrawal, filtration and return of the water to the evaporator.

While I have specifically described my invention together with the details of its practical application and the preferred form of apparatus for carrying it out, it is to be understood that the invention is not so limited, but may be otherwise embodied within the scope of the following claims.

I claim:

1. The process of treating water containing scale forming impurities, which comprises removing from the water impurities which would tend to soften the scale, evaporating the water to such concentration as to cause the formation of a hard scale on the heating surfaces of the evaporator, and periodically deforming such heating surfaces to crack off the scale.

2. The process of treating water containing calcium sulphate and calcium carbonate, which comprises removing the calcium carbonate from the water in order to permit the formation of a hard scale consisting principally of calcium sulphate, evaporating the water to such a concentration as to form a hard calcium sulphate scale on the heating surfaces of the evaporator, and periodically deforming such surfaces to crack off the scale.

3. The process of treating water containing hard scale-forming and soft scale-forming impurities, which comprises removing from the water the soft scale forming impurities while permitting the hard scale forming impurities to remain therein, evaporating the water to such a concentration as to cause the formation of a hard scale on the heating surfaces of the evaporator, and periodically deforming such heating surfaces to crack off the scale.

4. The process of treating water containing hard scale forming and soft scale forming impurities, which comprises evaporating the water to such a concentration as to cause the formation of scale on the heating surfaces of the evaporator, continually withdrawing water from the evaporator and filtering it to remove soft scale forming impurities and returning the filtered water to the evaporator, whereby a hard scale is formed on the heating surfaces of the evaporator, and periodically deforming such heating surfaces to crack off the scale.

5. The combination with an evaporator having deformable heating surfaces, of means for removing soft scale forming substances from the evaporator water while permitting the formation of hard scale on the heating surfaces, and means for periodically deforming such heating surfaces to crack off the hard scale.

6. The combination with an evaporator having deformable heating surfaces, of means for withdrawing water from the evaporator, removing soft scale forming impurities therefrom and returning the water to the evaporator, whereby hard scale is formed on the deformable heating surfaces, and means for periodically deforming said surfaces to crack off the hard scale.

In testimony whereof I have hereunto set my hand.

GEORGE W. SMITH